(12) United States Patent
Yano et al.

(10) Patent No.: US 6,497,379 B2
(45) Date of Patent: Dec. 24, 2002

(54) SEAT BELT RETRACTOR

(75) Inventors: Hideaki Yano, Tokyo (JP); Koji Tanaka, Tokyo (JP); Hiromasa Tanji, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/842,667

(22) Filed: Apr. 27, 2001

(65) Prior Publication Data

US 2002/0017583 A1 Feb. 14, 2002

Related U.S. Application Data

(60) Provisional application No. 60/201,278, filed on May 2, 2001.

(51) Int. Cl.[7] .............................................. B60R 22/28
(52) U.S. Cl. .................................................. 242/379.1
(58) Field of Search ....................... 242/379.1; 280/805, 280/806; 297/470–472

(56) References Cited

U.S. PATENT DOCUMENTS

| | | | | |
|---|---|---|---|---|
| 4,323,205 A | * | 4/1982 | Tsuge et al. .............. | 242/379.1 |
| 5,618,006 A | * | 4/1997 | Sayles ..................... | 242/379.1 |
| 5,924,641 A | * | 7/1999 | Keller et al. ............. | 242/379.1 |
| 5,967,442 A | * | 10/1999 | Wier ........................ | 242/379.1 |
| 6,113,022 A | * | 9/2000 | Ono et al. ................ | 242/379.1 |
| 6,206,315 B1 | * | 3/2001 | Wier ........................ | 242/379.1 |
| 6,216,972 B1 | * | 4/2001 | Rohrle ..................... | 242/379.1 |
| 6,267,314 B1 | * | 7/2001 | Singer et al. ............. | 242/379.1 |
| 6,302,346 B1 | * | 10/2001 | Brown et al. ............. | 242/379.1 |

FOREIGN PATENT DOCUMENTS

JP          05-278566          10/1993

* cited by examiner

*Primary Examiner*—John M. Jillions
(74) *Attorney, Agent, or Firm*—Foley & Lardner

(57) ABSTRACT

A seat belt retractor including an energy absorbing mechanism which can reliably satisfy a requirement to absorb the energy flexibly is provided. When a first pulley is rotated clockwise by an extraction of a webbing in an emergency, a wire, which is connected to the first pulley at one end, is pulled. Thus, a second pulley, to which the other end of the wire is connected, is rotated clockwise around a second rotational shaft. The second rotational shaft is disposed at a position away from the center of the second pulley. Thus, the rotational diameter gradually increases and a torque applied by the wire for rotating the second pulley is gradually reduced. Since the second rotational shaft is connected to a torsion bar, a load applied to the torsion bar is reduced after reaching a limit load.

6 Claims, 15 Drawing Sheets

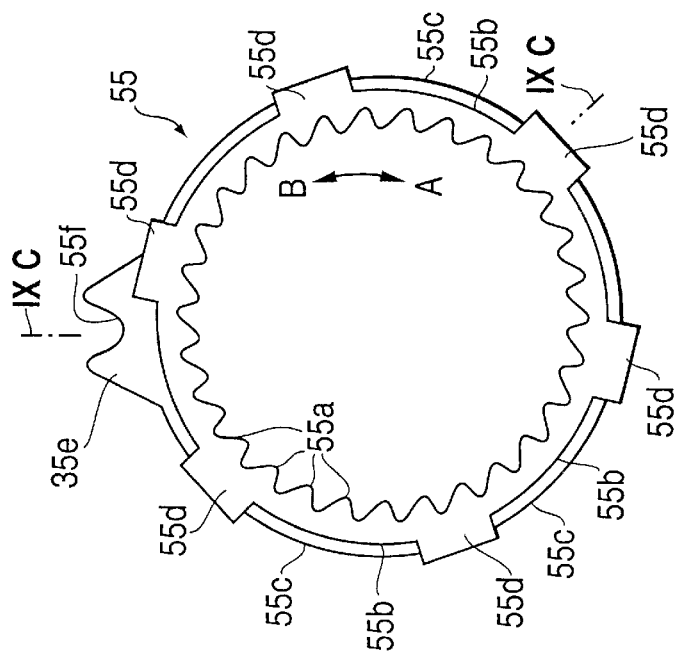
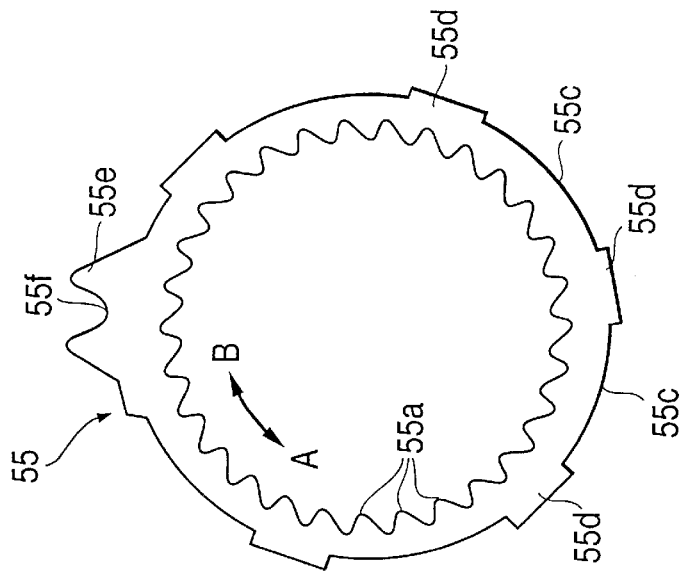

SEAT BELT RETRACTOR

CROSS REFERENCE TO RELATED APPLICATIONS

The present application claims priority to and the benefit of U.S. Provisional Patent Application Serial No. 60/201,278 filed May 2, 2001. The disclosure of the foregoing application is incorporated by reference herein in its entirety.

BACKGROUND

The present invention relates to seat belt retractors used in seat belt apparatuses which are installed in vehicles such as automobiles, etc., for restraining and protecting an occupant by a webbing. The seat belt retractors allow a free extraction and retraction of the webbing in a normal situation, and stop the extraction of the webbing in an emergency, for example, when a large deceleration occurs from a vehicle collision. More specifically, the present invention relates to a seat belt retractor including an energy absorbing mechanism (which will also be referred to as an EA ("Energy Absorbing") mechanism in the following descriptions), which, when the extraction of the webbing is stopped in an emergency, absorbs an impact energy and limits a load applied to the webbing within a predetermined load limit.

Conventionally, seat belt apparatuses are installed in vehicles such as automobiles, etc., for restraining and protecting an occupant by a webbing. A typical seat belt apparatus includes a seat belt retractor which allows free extraction and retraction of the webbing in a normal situation, and stops the extraction of the webbing in an emergency as described above.

Various seat belt retractors have been suggested which include an EA mechanism, which, when the extraction of the webbing is stopped in an emergency, absorbs an impact energy caused by an inertial movement of an occupant, and limits a load applied to the webbing within a predetermined load limit. As an example of the EA mechanism which limits the load applied to the webbing, there is a mechanism in which a torsion bar is attached to a spool provided for winding the webbing in such a manner that the torsion bar and the spool have the same rotational center. When the extraction of the webbing is stopped in an emergency, the torsion bar is twisted so that the energy is absorbed and the load applied to the webbing is limited.

In the EA mechanism of seat belt retractors, an EA load is preferably controlled in accordance with various conditions including a physical size of an occupant, velocity of a vehicle at the moment of collision, etc., for absorbing an impact energy applied to an occupant more effectively.

However, in the above-described conventional seat belt retractors, the load limited by the EA mechanism (the EA load) is set to a constant value. Accordingly, it is difficult for the conventional seat belt retractors to reliably satisfy the above-described requirement to absorb the energy flexibly.

Accordingly, in view of the above-described situation, an object of the present invention is to provide a seat belt retractor including an EA mechanism which can reliably satisfy the above-described requirement to absorb the energy flexibly.

SUMMARY OF THE INVENTION

According to the present invention, a seat belt retractor which, in a normal situation, allows a free extraction and retraction of a webbing which is wound around a spool, and which, in an emergency, restrains an occupant by stopping the extraction of the webbing is provided. The retractor includes an energy absorbing mechanism which, in the emergency, limits a load applied to the webbing within a load limit. The mechanism has a load limiting characteristic such that the load on the webbing is gradually reduced after reaching the load limit.

In addition, according to another aspect of the present invention, the energy absorbing mechanism includes a torsion bar which is twisted by a torque caused by an extraction force applied to the webbing in the emergency. The bar absorbs an impact energy which occurs in the emergency. The torque is gradually reduced so that, in the load limiting characteristic of the energy absorbing mechanism, the load on the webbing is gradually reduced after reaching the load limit.

In addition, according to still another aspect of the present invention, a circular pulley is attached to the torsion bar in a decentered (i.e. off-centered) manner and a wire is wound around the circular pulley. The wire is pulled by a force caused by the extraction force applied to the webbing, so that the torque is gradually reduced.

In addition, according to yet another aspect of the present invention, the energy absorbing mechanism includes a wire of which the diameter is gradually reduced and paired members which sandwich and compress the wire. The wire is pulled by a force caused by the extraction force applied to the webbing in the emergency. The compression force applied to the wire by the paired members is gradually reduced, so that, in the load limiting characteristic of the energy absorbing mechanism, the load on the webbing is gradually reduced after reaching the load limit.

According to another aspect of the present invention, the energy absorbing mechanism includes a wire having a constant diameter and paired members which sandwich and compress the wire and which are arranged in such a manner that a gap therebetween varies. The wire is pulled, while the gap between the paired members is increased, by a force caused by the extraction force applied to the webbing in the emergency. The compression force applied to the wire by the paired members is gradually reduced, so that, in the load limiting characteristic of the energy absorbing mechanism, the load on the webbing is gradually reduced after reaching the load limit.

The energy absorbing mechanism may comprise a wire having constant diameter and a load limiting member which has a meandered guide groove in which the wire is fitted. The wire is pulled by a force caused by the extraction force applied to the webbing in the emergency and a length of a part of the wire which remains inside the meandered guide groove is reduced. As a result, in the load limiting characteristic of the energy absorbing mechanism, the load on the webbing is gradually reduced after reaching the load limit.

According to another aspect of the present invention, the energy absorbing mechanism includes a torsion bar which is twisted by a torque caused by an extraction force applied to the webbing in the emergency, and which absorbs an impact energy which occurs in the emergency. The mechanism further includes a pulley which is attached to the torsion bar and which has such an exterior that a rotational radius, which is the distance between the rotational center and the periphery, varies. The retractor also includes a wire which is wound around the pulley and is connected to the pulley at an end thereof. The wire is pulled by a force caused by the extraction force applied to the webbing and the pulley is rotated so that the torque is applied to the torsion bar. In addition, the rotational radius of the pulley varies so as to gradually reduce the torque, so that, in the load limiting characteristic of the energy absorbing mechanism, the load on the webbing is gradually reduced after reaching the load limit.

In addition, according to yet another aspect of the present invention, the energy absorbing mechanism includes a torsion bar which is attached to the spool in such a manner that the torsion bar and the spool have the same rotational center. The energy absorbing mechanism has a load limiting characteristic which is the sum of a load limiting characteristic obtained from the torsion bar attached to the spool and the load limiting characteristic in which the load is gradually reduced after reaching the load limit.

In a seat belt apparatus in which the present invention is applied, the energy absorbing mechanism has a load limiting characteristic such that the load on the webbing is gradually reduced after reaching the load limit. Thus, the load applied to an occupant by the webbing W during a vehicle collision is gradually reduced with time. Accordingly, by setting the inclination of the load reduction in the load limiting characteristics, the requirement to absorb the energy flexibly may be reliably satisfied.

The energy absorbing mechanism is constructed with a torsion bar, a pulley, and a wire. In addition, according to other aspects of the present invention, the energy absorbing mechanism may be constructed with a wire and paired members which sandwich and compress the wire. Alternatively, the energy absorbing mechanism may be constructed with a wire and a load limiting member which has a meandered guide groove in which the wire is fitted. In either case, the energy absorbing mechanism having a simple construction may be realized at a low cost.

The energy absorbing mechanism may have a total load limiting characteristic which is the sum of the two load limiting characteristics. Accordingly, load limiting characteristic may be flexibly set, so that the requirement to flexibly absorb the energy may be reliably satisfied.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 4(a)–4(c) are a diagram which shows a locking ring used in the seat belt retractor shown in FIG. 1, wherein (a) is a side view as seen from the left, (b) is a side view as seen from the right, and (c) is a sectional view of (a) which is cut along line IXC—IXC.

DETAILED DESCRIPTION

Figure 1:
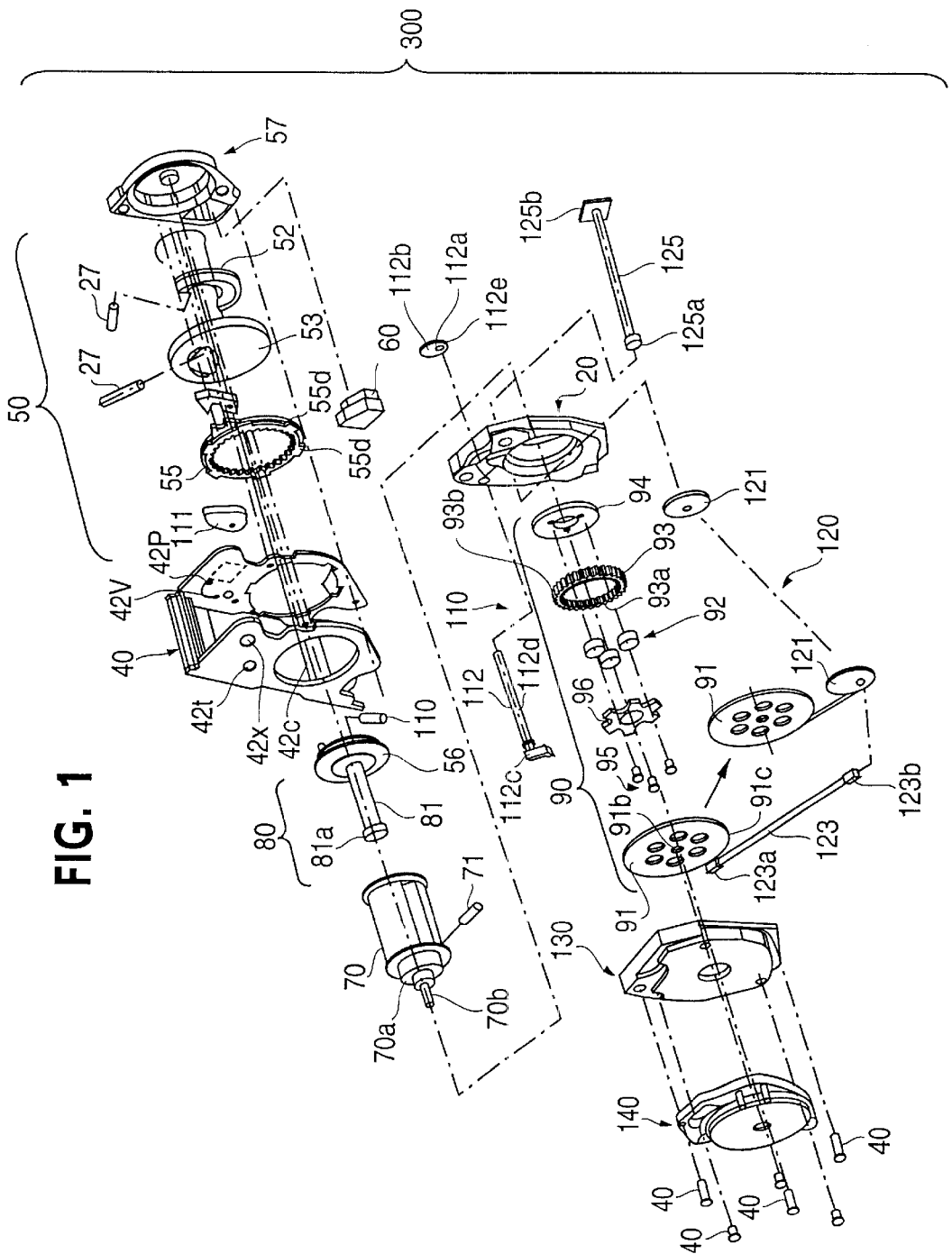
FIG. 1 is an exploded perspective view of an overall construction of a seat belt retractor according to a first embodiment of the present invention.
Figure 2:
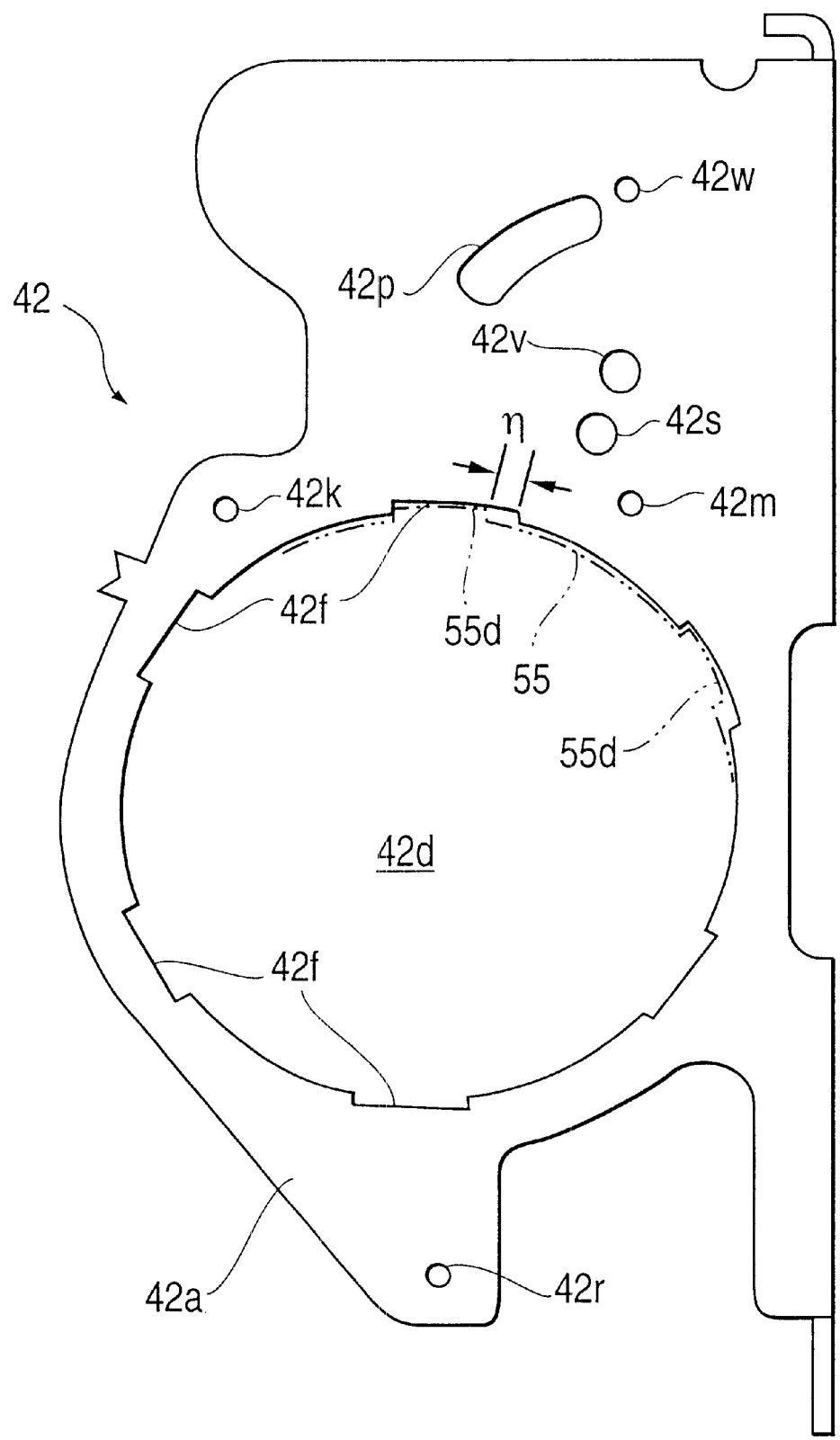
FIG. 2 is a side view of a frame included in the seat belt retractor according to the first embodiment as seen from the right.
Figure 3:
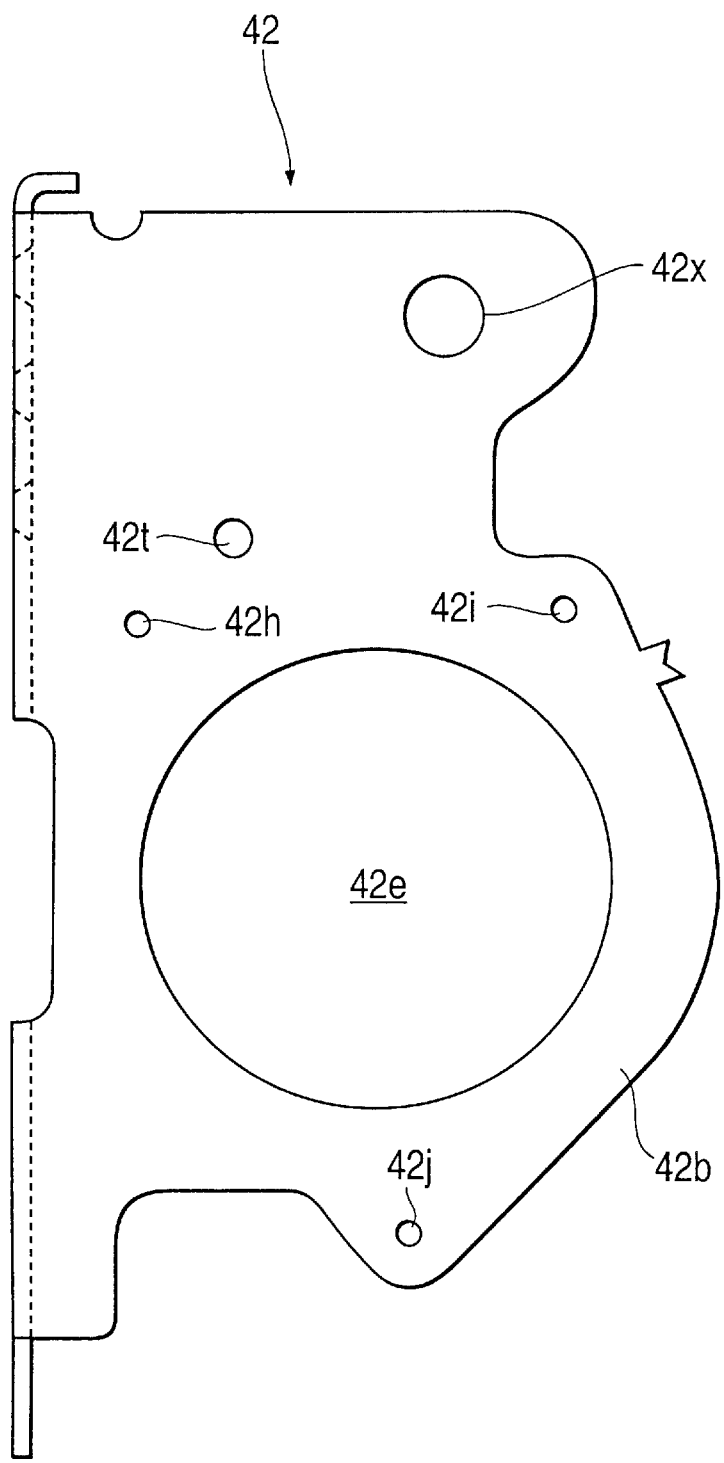
FIG. 3 is a side view of the frame included in the seat belt retractor according to the first embodiment as seen from the left.

Embodiments of the present invention will be described below with reference to the accompanying drawings. FIG. 1 is an exploded perspective view of an overall construction of a seat belt retractor according to a first embodiment of the present invention. FIG. 2 is a side view of a frame included in the seat belt retractor as seen from the right, and FIG. 3 is a side view of the frame included in the seat belt retractor as seen from the left.

As shown in FIG. 1, a basic construction of a seat belt retractor 300 of the first embodiment is partly the same as the construction described in the Japanese Unexamined Patent Application Publication No. 5-278566, published Oct. 26, 1993 (incorporated by reference herein), of which the present applicant is the inventor. Construction of the common parts can be understood by referring to the above-described Patent Application Publication.

As shown in FIG. 1, a seat belt retractor 300 is provided. The retractor 300 includes a belt retractor base 40 which supports various components of the seat belt retractor 300. A seat belt lock activating mechanism 50 is provided for locking the extraction of a webbing W in an emergency.

A sensor unit 60 is also provided. The unit 60 includes a vehicle sensor which serves as a deceleration sensing means such as, for example, described in the above-described Patent Application Publication (see the description regarding the deceleration sensing means 7 shown in FIGS. 3, 24, and 26 in the above-described Patent Application Publication).

A webbing W for restraining a body of an occupant is wound onto a spool 70. The spool 70 is connected to the seat belt lock activating mechanism 50. An end portion of the spool is inserted through a central hole formed in a carrier 94. A bottom portion 70a of the end portion being fitted inside the central hole of the carrier 94, and a tip portion 70b of the end portion being inserted through a central hole of a first pulley, which will be described below, in a slidable and rotatable manner;

A first EA mechanism 80 is provided. The first EA mechanism 80 includes a first torsion bar 81, which is configured to twist due to the rotational force of the spool 70 when a rotation of a locking base 56 in the extraction direction of the webbing W is restrained in an emergency so that a first EA load is obtained.

The retractor 300 includes a first pulley 91 which is constructed with a large-diameter portion 91c and a small-diameter gear 91b which are integrally formed with each other. A planetary gear mechanism 90 is also provided. The gear mechanism 90 includes three planetary gears 92 which are engaged with the small-diameter gear 91b of the first pulley 91. The gear mechanism 90 also includes an internal gear 93 having an internal gear portion 93a, which is engaged with the three planetary gears 92, in the inner periphery thereof and an external gear portion 93b in the outer periphery thereof A carrier 94 supports the three planetary gears 92 with pins 95 in a rotatable manner. The carrier 94 is able to receive a rotational force of the planetary gears 92 when the rotation of the internal gear 93 is stopped.

An internal gear restraining mechanism 110 serves to stop the clockwise rotation (shown in FIG. 1) of the internal gear 93 in the planetary gear mechanism 90. The restraining mechanism employs the rotation of the seat belt lock activating mechanism 50, and includes a restraining tab 112c which is able to restrain the internal gear portion 93b of the internal gear 93 and stop the clockwise rotation (in FIG. 1) of the internal gear 93. An acceleration plate 96 is disposed between the three pins 95 and the three planetary gears 92 in a slidable manner;

A second EA mechanism 120 provides a second EA load which varies with time in accordance with the rotational force applied to the spool 70. The second EA mechanism 120 functions after the rotation of the internal gear 93 is stopped as described above.

The retractor 300 includes a second cover 130 which is attached to a second retainer 20 with a plurality of screws 40, and covers the entire region in which the gears are disposed. A return spring unit 140 is attached to the second cover 130, and constantly applies force to the spool 70 in the retraction direction of the webbing W by a spring (see, for example, FIGS. 2 and 8 and the descriptions thereof in Japanese Patent Publication 5-278566 described above).

The seat belt retractor 300 will be described further below in detail. The seat belt retractor base 40 is constructed with a frame 42 which is formed in the shape of a bracket, and which includes a right side plate 42a and a left side plate 42b. The right and the left side plates 42a and 42b are connected to each other with a connecting member 42c, so that the frame 42 is reinforced. As shown in FIG. 2, the right side plate 42a is provided with a circular opening 42d for receiving the seat belt lock activating mechanism 50 in an operable manner. In addition, six concavities 42f are formed in the periphery of the opening 42b at a constant interval. A part of a locking ring 55 is fitted inside the opening 42d of the right side plate 42a in a rotatable manner with a very small clearance therebetween FIG. 4 shows the locking ring used in the first embodiment of the present invention, wherein (a) is a side view as seen from the left, (b) is a side view as seen from the right, and (c) is a sectional view of (a) which is cut along line IXC—IXC. As shown in FIG. 4, the locking ring 55 is formed in a ring-like shape, and a predetermined number of pointed teeth 55a are formed along the entire region of the inner periphery thereof. With respect to the teeth 55a, the surfaces facing the extraction direction A are relatively steep, and the surfaces facing the retraction direction B are relatively gentle. In addition, as shown in FIG. 4(c), the right side and the left side of the locking ring 55 have different diameters, and the cross section thereof includes a step.

More specifically, a peripheral portion 55b of the locking ring 55 at the left side has a small diameter, and a peripheral portion 55c of the locking ring 55 at the right side has a large diameter. The diameter of the peripheral portion 55b at left side is approximately the same as, or is slightly less than, the diameter of the opening 42d formed in the right side plate 42a. In addition, the peripheries 55b and 55c are provided with six convexities 55d which are disposed at a constant interval. The length of the convexities 55d in the circumferential direction is less than that of the concavities 42f formed in the right side plate 42a of the frame 42 by a predetermined amount η.

Figure 5A:
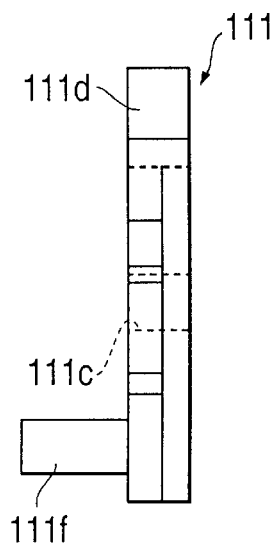
FIGS. 5(a)–5(b) are a diagram which shows an arm which is used in the seat belt retractor shown in FIG. 1, wherein (a) is a side view and (b) is a front view.
Figure 5B:
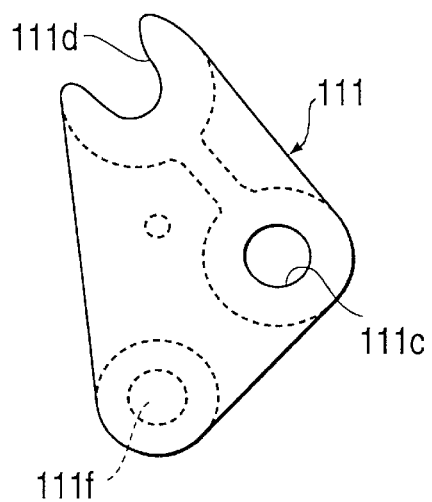

As shown in FIG. 4, the peripheral portion 55c at the right side of the locking ring 55 is provided with a connecting portion 55e, to which an arm 111 is connected in a rotatable manner. In addition, as shown in FIG. 4, the connecting portion 55e is provided with a notch 55f in which a connecting pin 111f, which projects from the arm 111 shown in FIG. 5, is inserted. The manner in which the arm 111 and the locking ring 55 are engaged with each other is described in the above-mentioned Japanese Patent Publication 5-278566 (see FIGS. 4, 33, and 34 and accompanying descriptions).

Figure 6:
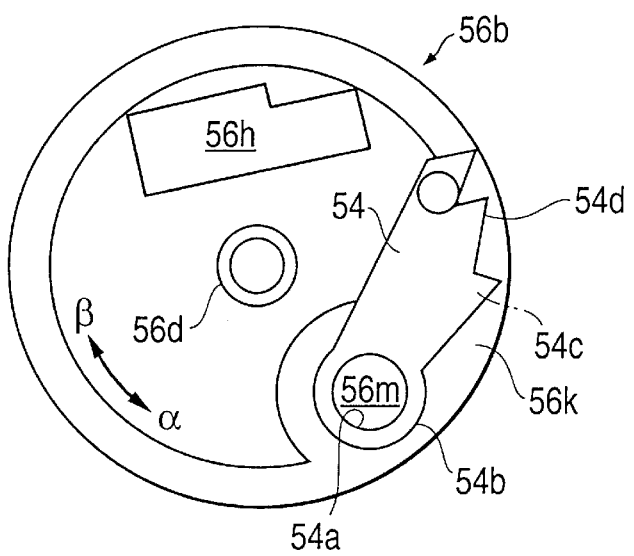
FIG. 6 is a diagram which shows a manner in which a locking base, which is used in the seat belt retractor shown in FIG. 1, supports a main pawl.
Figure 7C:
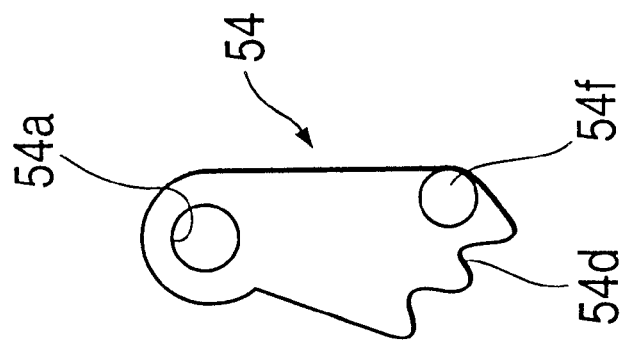
FIGS. 7(a)–7(c) are a diagram of the main pawl used in the seat belt retractor shown in FIG. 1, wherein (a) is a front view, (b) is a side view, and (c) is a rear view.
Figure 7B:
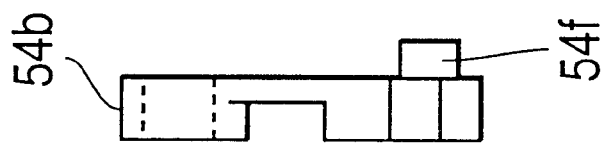
Figure 7A:
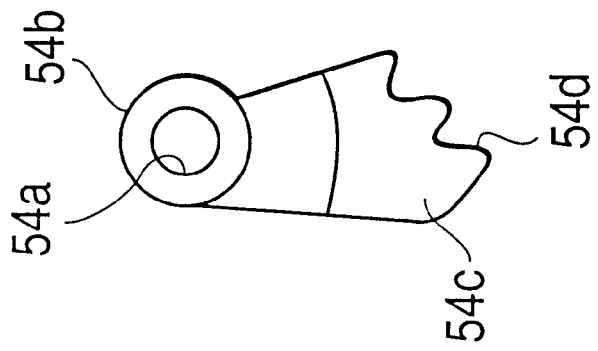

FIG. 5 is a diagram which shows an arm used in the first embodiment, wherein (a) is a side view and (b) is a front view. FIG. 6 is a diagram which shows a manner in which a main pawl is supported on the locking base used in the first embodiment by a shaft. FIG. 7 is a diagram which shows the main pawl used in the first embodiment, wherein (a) is a front view, (b) is a side view, and (c) is a rear view.

The peripheral portion 55b at the left side of the locking ring 55, which is constructed as described above, is fitted inside the opening 42d formed in the right side plate 42a in a rotatable manner with a very small clearance therebetween. The six convexities 55d are individually disposed inside the concavities 42f, and the locking ring 55 is able to rotate relative to the right side plate 42a by the rotational angle (for example, 5°), which is determined by the predetermined amount η. The predetermined amount η is the difference between the concavities 42f and the convexities 55$d$ in lengths in the circumferential direction. The teeth 55$a$ of the locking ring 55 can be engaged with a main pawl 54 which is shown in FIG. 6. One end of the main pawl 54 is supported by a pin 56$m$ which projects from a flange portion 56$b$ of the locking base 56, in a rotatable manner. The other end of the main pawl 54 is formed as a retaining portion which is disposed in a first receiving concavity 56$k$. Reference numeral 56$h$ denotes a second receiving concavity formed in the locking base 56.

As shown in FIG. 7, the main pawl 54 is shaped approximately like a fan, and is provided with a boss portion 54$b$ having a through hole 54$a$ at the pivot of the fan. The main pawl 54 is also provided with a claw portion 54$c$ at the other end of the pivot. The claw portion 54$c$ is provided with an engaging portion 54$d$ at an end thereof, which can be engaged with the teeth 55$a$ of the locking ring 55 which is attached to the left side plate 42$a$ of the frame 42.

In addition, as shown in FIG. 2, the left side plate 42$a$ is provided with three retaining holes 42$k$, 42$m$, and 42$r$ and holes 42$v$ and 42$w$. A lever screw (not shown) is inserted and is fixed inside the hole 42$v$. The screw is the rotational shaft of the arm 111 and supports a torsion spring (not shown) which applies force to the arm 11 in one direction. In addition, one end of the torsion spring is restrained by the hole 42$w$.

The seat belt lock activating mechanism 50 includes a first locking gear cover 51 and an inertial body 52 which serves as a webbing sensor. The lock activating mechanism 50 also includes a locking gear 53, the main pawl 54, and the locking ring 55. The first locking gear cover 51, the inertial body 52, the locking gear 53, the main pawl 54, and the locking ring 55 correspond to the following elements of Japanese Patent Application Publication 5-278566 (mentioned above): first locking gear cover 13, the inertial body 15, the locking gear 14, the main pawl 17, and the locking ring 23, respectively.

In addition, as shown in FIG. 1, the seat belt retractor 300 according to the first embodiment of the present invention includes the locking base 56 which is fixed to an end of the first torsion bar 81. The locking base 56 supports the main pawl 54 in a rotatable manner. The other end 81$a$ of the torsion bar 81 is fitted in a concavity formed in a hollow portion of the spool 70 and is joined with the spool 70. Thus, the torsion bar 81 is able to rotate together with the spool 70, and is restrained by a detent pin 71 which is inserted from the side of the spool 70.

The operation of the seat belt lock activating mechanism 50 is almost the same as the operation described in the above-mentioned Japanese Patent Application Publication 5-278566 except for the operation of the first torsion bar 81. However, the operation including that of the first torsion bar 81 will be briefly described below.

In a normal situation, the locking gear 53 rotates freely. Thus, the main pawl 54 is not engaged with the teeth 55$a$ of the locking ring 55, and the locking base 56, the first torsion bar 81, and the spool 70 also rotate freely. Accordingly, the webbing W can be extracted or retracted freely. When the seat belt is not fastened, the entire part of the webbing member W is wound by the spool 70 due to the force applied by the return spring unit 140, and the webbing W is drawn inside the seat belt retractor 300. The seat belt can be fastened by extracting the webbing W, wrapping the webbing W around the occupant, and inserting a tongue (not shown) into a buckle.

If, while the seat belt is fastened, large deceleration of the vehicle occurs in an emergency, for example, during a vehicle collision, the vehicle sensor of the sensor unit 60 is activated, and locks (stops) the rotation of the locking gear 53 in the extraction direction. As the webbing W is extracted due to the inertial movement of the occupant, the spool 70 rotates in the direction for extracting the webbing. Due to the rotation of the spool 70, the locking base 56 also rotates in the same direction via the first torsion bar 81. Thus, relative rotation occurs between the locking base 56 and the locking gear 53. This relative rotation causes the rotation of the main pawl 54, and the main pawl 54 becomes engaged with the teeth 55$a$ of the locking ring 55. Then, the rotation of the spool 70 is transferred to the locking ring 55 via the main pawl 54, and the locking ring 55 also rotates in the same direction. As described above, the locking ring 55 rotates in the rotational angle determined by the predetermined amount η, and is then restrained by the left side plate 42$a$ of the frame 42, so that the rotation thereof is locked.

When the rotation of the locking ring 55 is locked, the rotation of the locking base 56 is also locked. However, the spool 70 continuously tries to rotate in the same direction, so that the first torsion bar 81 is twisted, and the impact energy, caused when a large deceleration occurs, is absorbed. Accordingly, in the first EA mechanism 80, the load applied to the webbing is limited within the first EA load due to a torsional deformation of the first torsion bar 81. Eventually, the rotation of the spool 70 in the extraction direction is locked and the extraction of the webbing W is stopped.

In addition, also in a case in which the webbing W is extracted at a very high speed, the extraction of the webbing W is stopped. In this case, the rotational speed of the locking gear 53 is so high that the operational delay of the inertial body 52 (webbing sensor), which is pivotally supported by the locking gear 53, occurs. Then, the inertial body 52 becomes engaged with an internal gear portion (not shown) formed in the first locking gear cover 51. Accordingly, the rotation of the locking gear 53 is locked, and extraction of the webbing W is stopped in the similar manner as described above.

In addition, the rotation of the locking ring 55 is used in the operation of the second EA mechanism 120 which will be described below. As shown in FIG. 3, the right side plate 42$b$ is provided with a central opening 42$e$ for attaching the planetary gear mechanism 90 in an operable manner. The planetary gear mechanism 90 includes, in addition to the planetary gears 92, the internal gear 93, and the carrier 94, the first pulley 91, the pins 95, and the deceleration plate 96.

As described above, the bottom portion 70$a$ of the end portion of the spool 70 is fitted in and joined with the carrier 94, and the tip portion 70$b$ of the end portion supports the first pulley 91 in a rotatable manner as a shaft.

Figure 8:
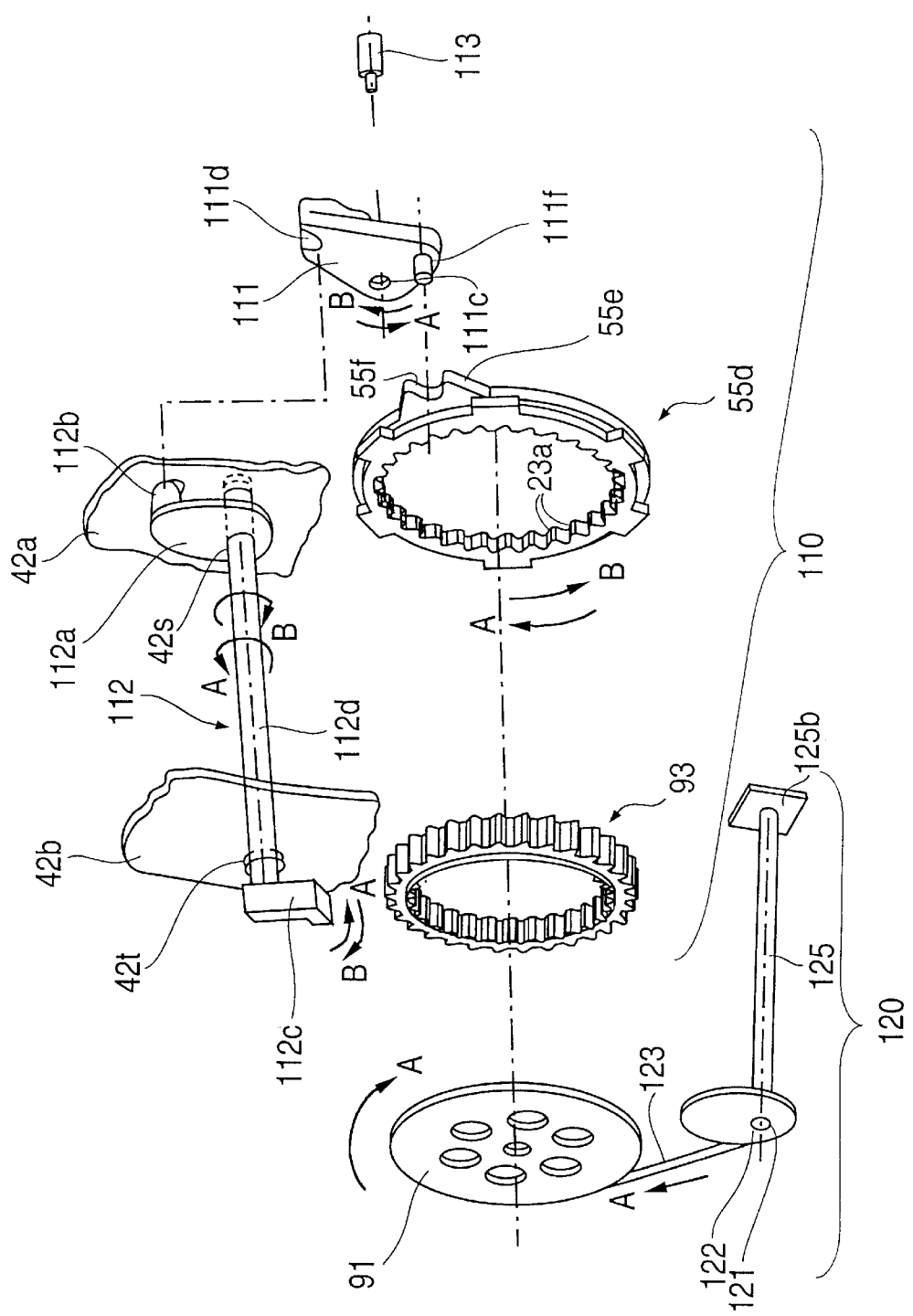
FIG. 8 is a schematic diagram which shows an internal gear restraining mechanism and an EA mechanism used in the first embodiment of the present invention.

Next, the internal gear restraining mechanism 110 for restraining the internal gear 93 will be described. FIG. 8 is a schematic diagram which shows a construction of the internal gear restraining mechanism 110 and the EA mechanism 120 which are used in the first embodiment of the present invention.

As shown in FIG. 8, the notch 55$f$ of the locking ring 55, which is a component of the seat belt lock activating mechanism 50, is engaged with the connecting pin 111$f$ of the arm 111, so that the locking ring 55 and the arm 111 are operatively connected with each other. The arm 111 is supported by the pin 113, which is inserted through the hole 111$c$ and is fitted in the hole 42$v$ formed in the left side plate 42$a$, in a pivotal manner. In addition, a notch 111$d$ formed in the arm 111 is engaged with a pin 112$d$, which projects from a plate 112$a$ at a position decentered from a shaft 112$b$ so that the arm 111 and the plate 112a are operatively connected with each other. The plate 112a is included in a lever pin 112, and is disposed at an end of the shaft 112d. The restraining tab 112c is formed at the other end of the shaft 112d in a manner such that the restraining tab 112c extends in a direction away from the pin 112b across the shaft 112d. The restraining tab 112c is able to become engaged with the external gear portion 93b of the internal gear 93 and restrain the rotation of the internal gear 93.

In addition, as shown in FIG. 8, the lever pin 112 is inserted, before the plate 112a is attached to an end of the shaft 112d, through the hole 42t, which is formed in the right side plate 42b on the outwardly facing surface thereof (from the left in FIG. 8), in a rotatable manner. Then, the plate 112a is attached to the end of the shaft 112d. As shown in FIG. 1, the plate 112a is provided with a through hole 112e, through which the shaft 112d is inserted so that the end of the shaft 112d slightly protrudes from the plate 112a. Then, the plate 112a is fixed to the shaft 112d in such a manner that the pin 112b is disposed in a direction relative to the shaft which is approximately opposite to the direction in which the restraining tab 112c protrudes. Then, a part of the shaft 112d which protrudes from the plate 112a is inserted in the hole 42s, which is formed in the left side plate 42a of the frame 42, in a rotatable manner.

The pin 112b is inserted through an elongated hole 42p, which is formed in the left side plate 42a of the frame 42. As is described in the above-mentioned Japanese Patent Application Publication 5-278566 with reference to FIG. 4, after the locking ring 55 is fitted inside the opening 42d in the left side plate 42a, the pin 11 if is inserted in the notch 55f of the locking ring 55 from the outwardly facing surface thereof. Then, the pin 113 is inserted through the hole 111c in the arm 111, and is fitted in the hole 42v in the left side plate 42a from the outwardly facing surface thereof in a manner such that the arm 111 receives a force from a spring (not shown).

In addition, as described in the above-mentioned Japanese Patent Application Publication 5-278566 with reference to FIG. 4, an end of the spring is attached to the hole 42w, and the other end is attached to the arm 111. The arm 111 receives a rotational force from the spring in the clockwise direction in FIG. 8 (counterclockwise direction in FIG. 4 in above-mentioned Japanese Patent Application Publication 5-278566). In addition, the end of the pin 112b, which is inserted through the elongated hole 42p and protrudes outward from the left side plate 42a, is engaged with the notch 111d of the arm 111. Accordingly, due to the force applied to the arm 111 in the clockwise direction (shown by arrow B around the arm 111 in FIG. 8), the lever pin 112 receives a rotational force in the direction shown by arrow B around the lever pin 112 in FIG. 8 via the pin 112b.

Accordingly, the restraining tab 112c of the lever pin 112 receives a force in the direction shown by arrow B, that is, in the direction which moves away from the external gear portion 93b of the internal gear 93.

In FIG. 8, only parts of the left side plate 42a and the right side plate 42b of the frame 42 are schematically shown.

The lever pin 112, which is constructed as described above, is supported by the frame 42 as described above in a rotatable manner. The lever pin 112 plays a major role in the operation of the internal gear restraining mechanism 110 which will be described below.

In FIG. 8, the extraction of the webbing W (in the upward direction of the figure) corresponds to the rotation of the lock ring 55 in the extraction direction A (clockwise direction). In addition, the retraction of the webbing W (in the downward direction of the figure) corresponds to the rotation of the lock ring 55 in the retraction direction B (counterclockwise direction). In a normal situation (when the webbing W does not receive a load), the locking ring 55 receives a rotational force in the retraction direction B (counterclockwise direction) due to the clockwise force applied to the arm 111 by the spring.

When the locking ring 55 rotates in the extraction direction A (clockwise direction) as described above, the arm 111 also rotates in the extraction direction A shown in FIG. 8 (counterclockwise direction), in association with the rotation of the locking ring 55. In addition, the lever pin 112 also rotates in the extraction direction A (counterclockwise direction) via the plate 112a, so that the restraining tab 112c becomes engaged with the external gear portion 93b of the internal gear 93 and the rotation of the internal gear 93 is locked. Thus, the rotational force of the spool 70 is transferred to the planetary gears 92 via the carrier 94, and the planetary gears 92 rotate and revolve at the same time, which causes the rotation of the first pulley 91. In other words, the rotational force of the spool 70 in the extraction direction is transferred to the first pulley 91 via the planetary gear mechanism 90, so that the first pulley 91 also rotates in the extraction direction A shown in FIG. 9 (clockwise direction).

In contrast, when the locking ring 55 rotates in the retraction direction B (counterclockwise direction), the arm 111 also rotates in the retraction direction B shown in FIG. 8 (clockwise direction), in association with the rotation of the locking ring 55. In this case, the lever pin 112 rotates in the retraction direction B (clockwise direction) and the restraining tab 112c moves away from the external gear portion 93b of the internal gear 93, so that the restraining tab 112c and the external gear portion 93b are not engaged with each other. Accordingly, the rotational force of the spool 70 is not transferred to the first pulley 91.

When, for example, the webbing W receives a relatively small load and is pulled, the locking mechanism is activated by the seat belt lock activating mechanism 50 and the restraining tab 112c of the lever pin 112 becomes engaged with the external gear portion 93b of the internal gear 93. Then, if the webbing W becomes free from the load, the restraining tab 112c moves away from the external gear portion 93b of the internal gear 93 due to the force applied by the arm 111, so that a normal state is reestablished.

Figure 9:
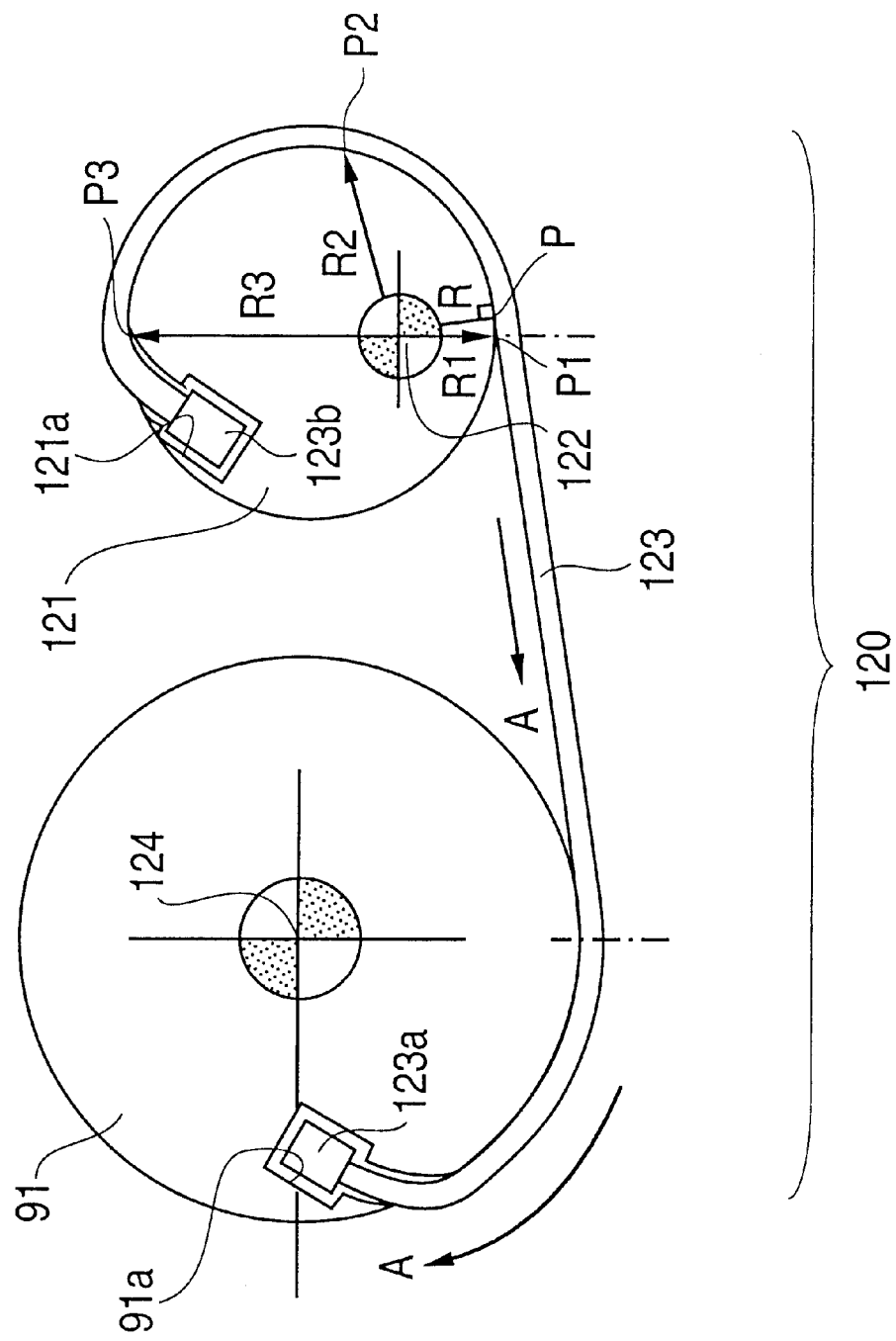
FIG. 9 is a schematic diagram which shows a second EA mechanism used in the first embodiment of the present invention.
Figure 10:
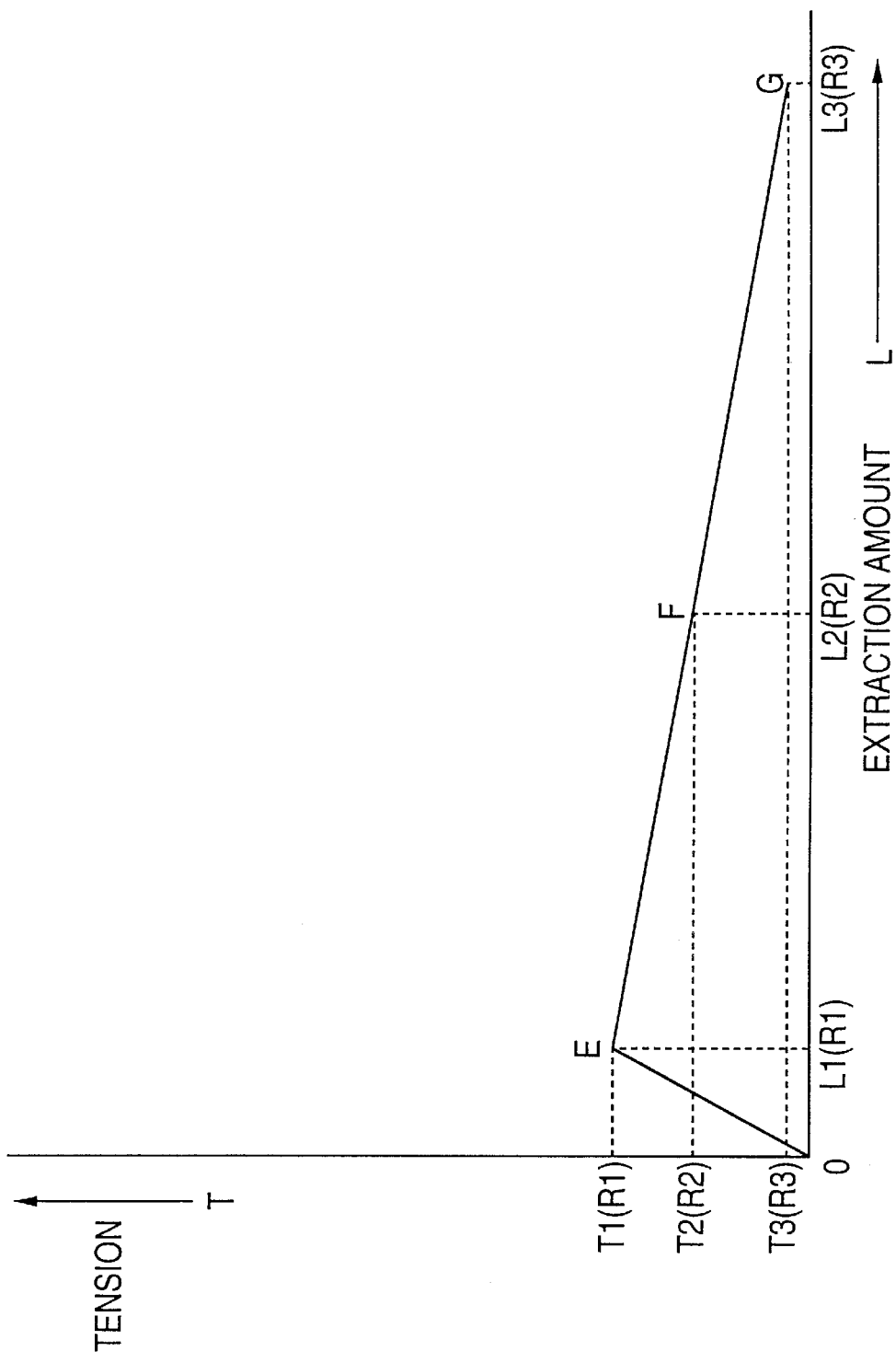
FIG. 10 is a graph which schematically shows a characteristic of a second EA load in the second EA mechanism which includes a second torsion bar shown in FIG. 9, wherein the horizontal axis shows an extraction amount L (mm) of the webbing and the vertical axis shows the tension T (N) applied to the webbing.

Next, the construction of the second EA mechanism 120 will be described below. FIG. 9 is a schematic diagram which shows a construction of the second EA mechanism 120 used in the first embodiment of the present invention. FIG. 10 is a graph which shows a load limiting characteristic of the second EA mechanism; that is, a relationship between the second EA load Tw and the extraction amount of the webbing W in the second EA mechanism 120.

As shown in FIG. 9, the first pulley 91 which is a component of the planetary gear mechanism 90, and which is provided with a first rotational shaft 124 at the center thereof, is connected to a circular second pulley 121 with a wire 123. The second pulley 121 is provided with a second rotational shaft 122 which is disposed at a position away from the center thereof. The wire 123 is provided with a detent portion 123a at an end thereof, which is fitted inside a receiving concavity 91a formed in the periphery of the first pulley 91. In addition, the wire 123 is also provided with a detent portion 123b at the other end thereof, which is fitted inside a receiving concavity 121a formed in the periphery of the second pulley 121 at a predetermined position. In addition, the second rotational shaft 122 of the second pulley 121 is provided with a hexangular hole (not shown), in which a connecting portion 125a formed at an end of a second torsion bar 125 is fitted and fixed. The connecting portion 125a is formed as a hexangular nut fixed to an end of the second torsion bar 125.

The second torsion bar 125 is inserted through a hole 42x formed in the right side plate 42b of the frame 42 from the outwardly facing surface of the right side plate 42b in a rotatable manner. In addition, a connecting portion 125b, which is a rectangular plate, is fixed at the other end of the second torsion bar 125. The connecting portion 125b is strongly fixed to the inwardly facing surface of the left side plate 42a at a connection area 43 (the area shown by the dotted line in FIG. 1) by a welding process, adhering process, etc.

As shown in FIG. 9, the position of the detent portion 123b determines the manner in which a length of a part of the wire 123 which is wound around the second pulley 121 and a length of an arm length R of the moment around the second rotational shaft 122 vary. For example, as shown in FIG. 9, when the first pulley 91 receives a rotational force in the extraction direction A, the wire 123 is pulled in the direction shown by arrow A. Thus, the part of the wire 123 which is wound around the second pulley 121 for the predetermined length is extracted. Accordingly, the second torsion bar 125 receives a torque caused by the extraction force applied to the webbing W and is twisted, so that a predetermined amount of the second EA load is applied in the direction in which the second rotational shaft 122 of the second pulley 121 is twisted.

In such a case, with respect to the rotational moment applied to the second rotational shaft 122, the arm length R of the rotational moment, which is the distance between the second rotational shaft 122 and a working point P, varies in the sequence with a minimum value R1, a middle value R2, and a maximum value R3. The working point P is a point in which a straight line which passes through the second rotational shaft 122 perpendicularly crosses the straight part of the wire 123 which extends straight without being wound around the second pulley 121. Thus, the rotational moment applied to the second rotational center 122 is maximum when the arm length R is R1, is gradually reduced, and is minimum when the arm length R is R3. Generally, torsion bars have a yield torsional load, and the torsion bar is twisted when an applied torsional load reaches the yield torsional load. Since the yield torsional load is constant, a load larger than the yield torsional load does not occur. Accordingly, torsion bars function as a force limiter. When the second torsion bar 125 having such a characteristic is linked with the mechanism in which the rotational moment is gradually reduced, the second EA load can also be gradually reduced.

For example, in FIG. 10, the horizontal axis shows an extraction amount L (mm) of the webbing W, and the vertical axis shows a tension T (N: newton) applied to the webbing W. In the horizontal axis, L1 is the extraction amount when the arm length R of the rotational moment is the minimum value R1, L2 is the extraction amount when the arm length R of the rotational moment is the middle value R2, and L3 is the extraction amount when the arm length R of the rotational moment is the maximum value R3.

The extraction amount L1 is the length of the webbing which is extracted before the second rotational shaft 122 starts to rotate (while the second rotational shaft 122 is stationary). The extraction amount L1 corresponds to a mechanical loss, which is the sum of the extension of the wire 123 caused by being wound more tightly around the first pulley 91 and the second pulley 121, the elongation of the wire 123 itself, etc.

The extraction amount L2 is the sum of the extraction amount L1 and the length of the webbing which is extracted while the second rotational shaft 122 is rotated and the arm length R of the rotational moment is increased from the minimum value R1 to the middle value R2. Similarly, the extraction amount L3 is the sum of the extraction amount L2 and the length of the webbing which is extracted while the second rotational shaft 122 is rotated and the arm length of the rotational moment is increased from the middle value R2 to the maximum value R3.

In addition, in the vertical axis, the tension T1 (R=R1) shows a yield point (yield torsional load) of the torsion bar when the extraction amount is L1 (R=R1). Starting from zero, the load proportionally increases until the second torsion bar 125 starts to rotate. Then, after the second torsion bar 125 starts to rotate, the tension T is reduced along with the increase of the extraction amount L, in an inversely proportional manner. More specifically, the EA load is first increased, and is then gradually reduced after reaching the peak. The graph shown in FIG. 10 shows the variation of the tension T in the second EA mechanism only, and mechanical loss, etc., which occurs in other mechanisms are omitted.

Figure 11:
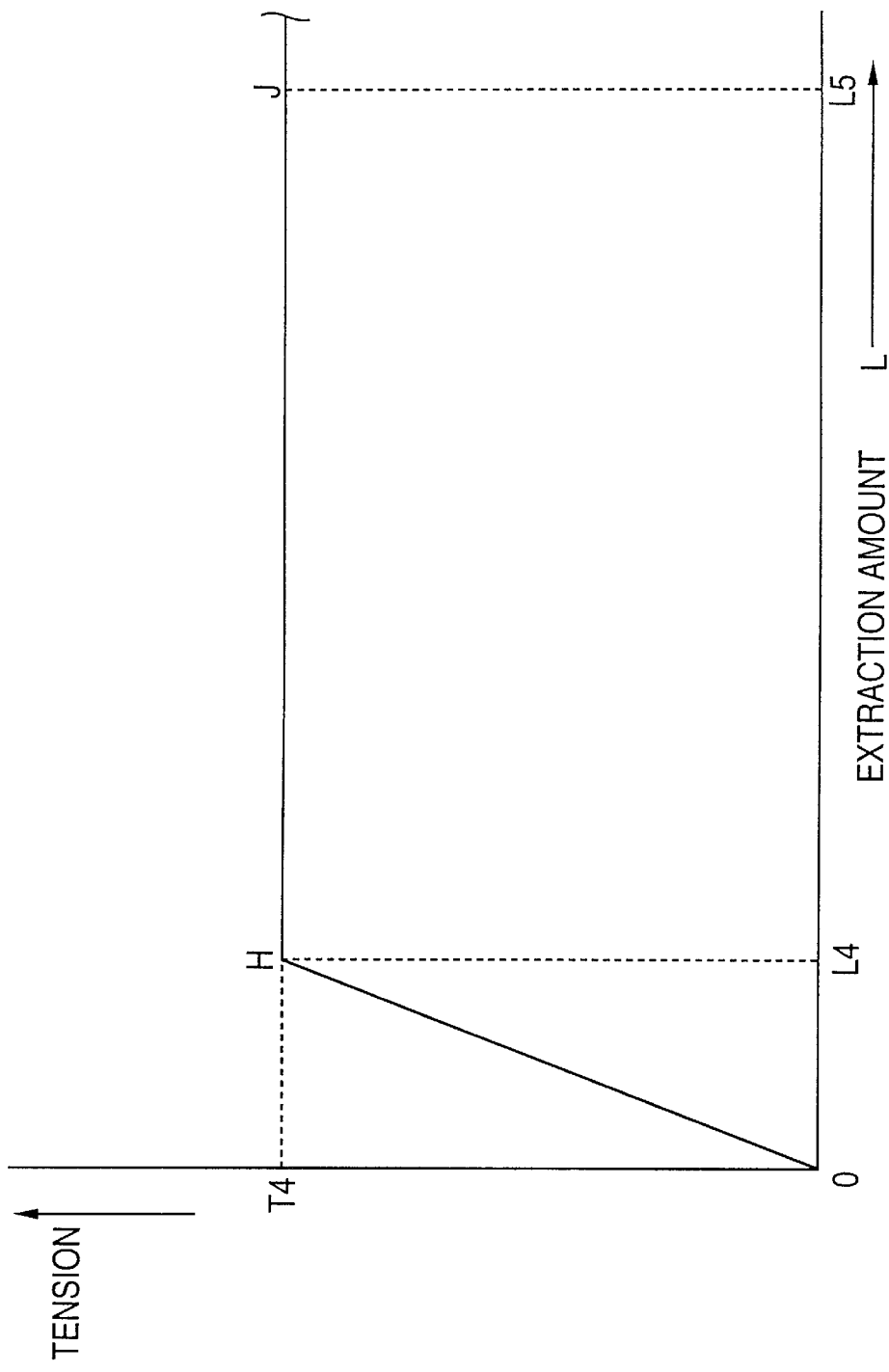
FIG. 11 is a graph which schematically shows a characteristic of a first EA load in a first EA mechanism which includes a first torsion bar, wherein the horizontal axis shows an extraction amount L (mm) of the webbing, and the vertical axis shows the tension T (N) applied to the webbing.

Next, the first EA mechanism 80, which is the conventional EA mechanism, will be described. FIG. 11 is a graph which schematically shows a characteristic of the first EA load applied to the first torsional bar. The horizontal axis shows the extraction amount L (mm) of the webbing W, and the vertical axis shows the tension T(N) applied to the webbing W.

As shown in FIG. 11, an extraction amount L4 shows a loss caused in the locking mechanism while the load applied to the first torsion bar 81 is less than the yield torsional load and the first torsion bar 81 is not rotated. More specifically, the extraction amount L4 shows a mechanical loss, which is the sum of the extension of the webbing W caused by being wound more tightly around the spool 70, the elongation of the webbing W itself, etc.

In addition, when the webbing W is extracted beyond the extraction amount L4, the load applied to the first torsion bar 81 reaches the yield torsional load, which is constant. Thus, even when the extraction amount is increased, the tension T is set to the limit load.

Next, a characteristic of the EA load, which is obtained in the case in which the first EA mechanism 80 and the second EA mechanism 120 are used in combination, will be obtained below. The combination of the first EA mechanism 80 and the second EA mechanism 120 is one of the characteristics of the present invention.

Figure 12:
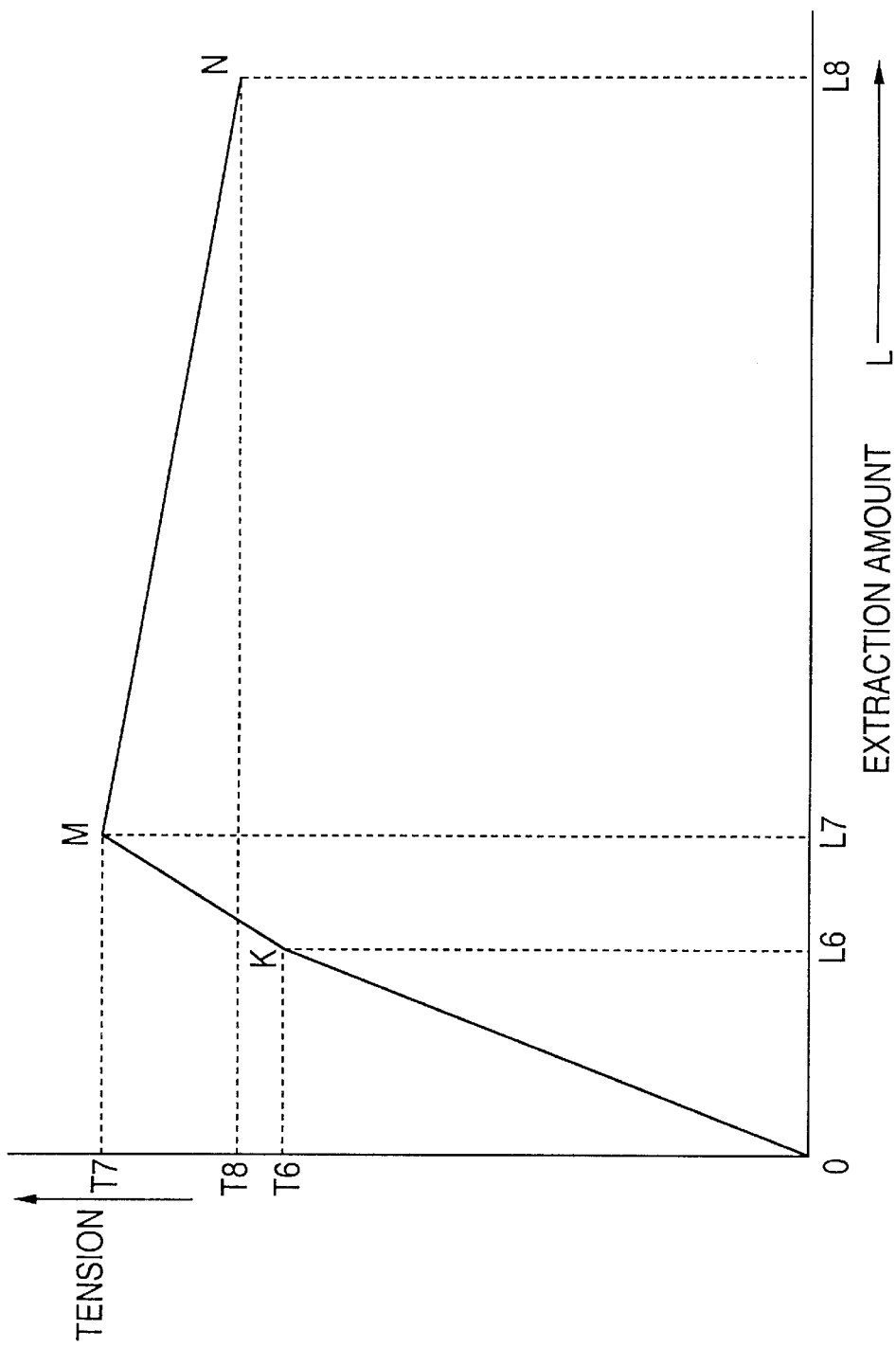
FIG. 12 is a graph which schematically shows a characteristic of an EA load of the seat belt retractor according to the first embodiment of the present invention, wherein the horizontal axis shows an extraction amount L (mm) of the webbing, and the vertical axis shows the tension T (N) applied to the webbing.

FIG. 12 is a graph which schematically shows a characteristic of the EA load obtained in the seat belt retractor 300 according to the first embodiment of the present invention. The above-described EA load is the sum of the first EA load obtained in the first EA mechanism and the second EA load obtained in the second EA mechanism. The horizontal axis shows an extraction amount L (mm), and the vertical axis shows the tension T (N) applied to the webbing W.

In the horizontal axis, L6 is the extraction amount of the webbing W caused by a mechanical loss which corresponds to the extraction amount L4 in FIG. 11 (L6=L4). In addition, the difference between the extraction amount L6 and the extraction amount L7 is the extraction amount of the webbing W caused by a mechanical loss which corresponds to the extraction amount L1 in FIG. 10 (L7−L6=L1). More specifically, line OK in FIG. 12 corresponds to line OH in FIG. 11 (line OK=line OH), and line KM in FIG. 12 corresponds to line OE in FIG. 10 (line KM=line OE). The inclination of the line between the extraction amounts L7 and L8 is the same as the inclination of the line between the extraction amounts L1 and L3 in FIG. 10, and line MN in FIG. 12 corresponds to line EG in FIG. 10 (line MN=line EG).

In addition, in the vertical axis, the tension T6 in FIG. 12 corresponds to the tension T4 in FIG. 11 (T6=T4), and the difference between the tensions T7 and T6 in FIG. 12 corresponds to the tension T1 in FIG. 10 (T7−T6=T1). In addition, the difference between the tensions T8 and T7 in FIG. 12 corresponds to the difference between the tension T1 and T3 in FIG. 10 (T7−T8=T1−T3).

Accordingly, by applying the above-described construction, the load on the webbing can be controlled in such a manner that the EA load is gradually reduced as shown by line MN in FIG. 12. Thus, in the seat belt retractor 300 according to the present invention, during a vehicle collision, the EA load applied to the occupant by the webbing W can be reduced with time after reaching the peak value.

Although not shown in the figure, the seat belt retractor 300 according to the first embodiment is provided with a pretension mechanism, which is activated by a chemical reaction (not shown). During a collision, when a vehicle receives an impact force, an impact detection signal is output from an acceleration sensor (not shown) or from a crash sensor (not shown), and the pretension mechanism is activated. Then, the spool 70 of the seat belt retractor 300 winds the webbing member W, so that the occupant is restrained immediately.

In addition, in the above-described first embodiment, the second pulley 121, the wire 123, and the second torsion bar 125 which are included in the second EA mechanism 120 are used for changing the second EA load with time. Other construction of the second EA mechanism 120 will be explained below.

FIG. 13 is a diagram which shows states of time of a part of a second EA mechanism 120 used in a second embodiment of the present invention, and states of time of a part of a second EA mechanism 120 used in a third embodiment of the present invention, wherein (a) to (c) correspond to the second embodiment, and (d) to (f) correspond to the third embodiment.

Figure 13D:
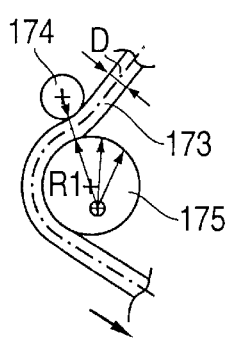
FIGS. 13(A)–13(F) are a diagram which shows states of time of a part of a second EA mechanism used in a seat belt retractor according to the second embodiment of the present invention and states of time of a part of a second EA mechanism used in a third embodiment of the present invention, wherein (a) to (c) correspond to the second embodiment, and (d) to (f) correspond to the third embodiment.
Figure 13A:
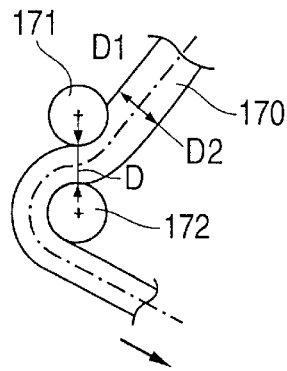
Figure 13E:
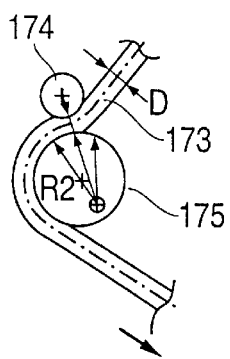
Figure 13B:
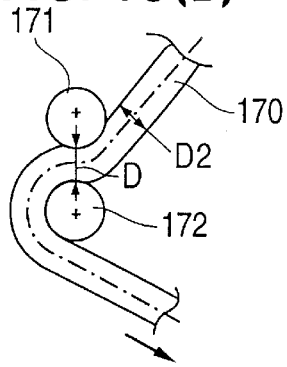
Figure 13F:
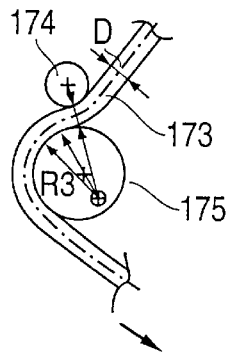
Figure 13C:
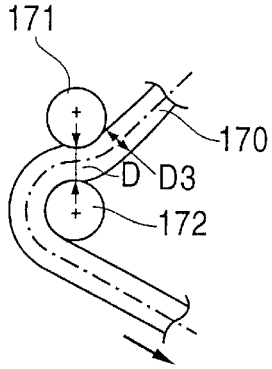

First, the second EA mechanism 120 according to the second embodiment will be described. As shown in FIGS. 13(a) to (c), the second EA mechanism 120 of the second embodiment is provided with, in place of the second pulley 121 and the second torsion bar 125 used in the first embodiment, strong fixed-type columns 171 and 172. The columns 171 and 172 (which are preferably able to rotate only) are separated from each other with a predetermined distance d therebetween, and the centers thereof are fixed. A wire 170 is sandwiched between the two columns 171 and 172, and the columns 171 and 172 serve as paired members which sandwich and compress a wire according to the present invention.

As shown in FIGS. 13(a) to (c), the thickness of the wire 170 gradually varies in the range of more than the distance d between the fixed-type columns 171 and 172. In the figure, the thickness of the wire 170 is reduced in the sequence of D1 shown in FIG. 13(a), D2 shown in FIG. 13(b), and D3 shown in FIG. 13(c) (in this case, D1>D2>D3>d). As shown in FIGS. 13(a) to (c), in the second EA mechanism 120, the wire 170 is pulled while it is compressed between the paired columns 171 and 172. While the wire 170 is compressed and is pulled, the compression force applied to the wire 170 by the paired columns 171 and 172 is gradually reduced, so that the second EA load can be varied.

Other constructions, operations, and effects of the second embodiment are generally the same as those in the first embodiment.

Next, the second EA mechanism 120 according to the third embodiment of the present invention will be described. As shown in FIGS. 13(d) to (f), the second EA mechanism 120 of the third embodiment is provided with, in place of the second pulley 121 and the second torsion bar 125 used in the first embodiment, a fixed-type column 174 (which is preferably able to rotate only) and a rotatable-type column 175. The center of the column 174 is fixed, and the column 175 is supported by a shaft, which is disposed at a decentered position, in a rotatable manner. A wire 173 is sandwiched between the two columns 174 and 175, and the columns 174 and 175 serve as paired members which sandwich and compress a wire according to the present invention.

As shown in FIG. 13, a distance R in the column 175 is gradually reduced in the range of more than a constant diameter D of the wire 173. In the figure, the distance R is reduced in the sequence of R1 shown in FIG. 13(d), R2 shown in FIG. 13(e), and R3 shown in FIG. 13(f) (in this case, R1>R2>R3>D, wherein D is the diameter of the wire 170). In other words, the gap between the two columns 174 and 175 is gradually increased. As shown in FIGS. 13(d) to (f), in the second EA mechanism 120, the wire 173 having the constant diameter D is pulled by a force caused by the extraction force applied to the webbing W. While the wire 170 is pulled through the gap between the columns 174 and 175, of which the distance R is gradually reduced, the compression force applied to the wire 173 by the columns 174 and 175 is gradually reduced, so that the second EA load can be varied. The exterior surface of the rotatable-type column is preferably treated by, for example, a knurling process so as to prevent slipping.

Other constructions, operations, and effects of the third embodiment are generally the same as those in the second embodiment.

FIG. 14 is a diagram of a second EA mechanism used in a seat belt retractor according to a fourth embodiment of the present invention. In FIG. 14, (a) is a perspective view which shows an entire body of the second EA mechanism according to the fourth embodiment, and (b) to (d) are schematic diagrams which show states of time of the second EA mechanism in which a wire is pulled in a direction shown by arrows.

Figure 14A:
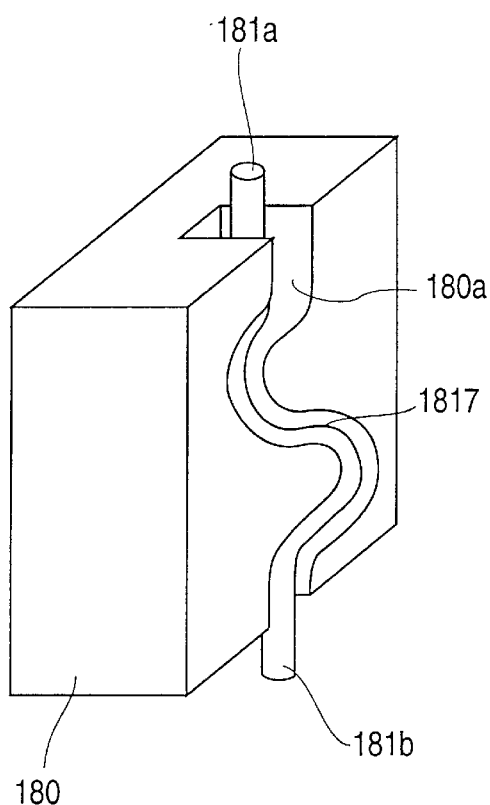
FIGS. 14(A)–14(D) are a diagram of a second EA mechanism used in a seat belt retractor according to a fourth embodiment of the present invention, wherein (a) is a perspective view which shows an entire body of the second EA mechanism, and (b) to (d) are schematic diagrams which show states of time of the second EA mechanism in which a wire is pulled in a direction shown by arrows.
Figure 14B:
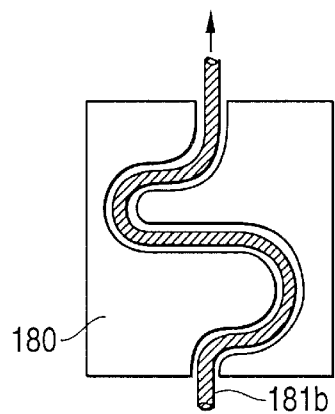
Figure 14C:
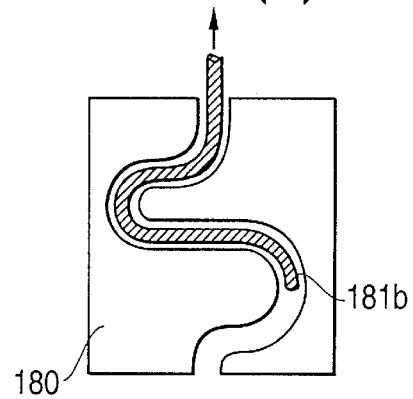
Figure 14D:
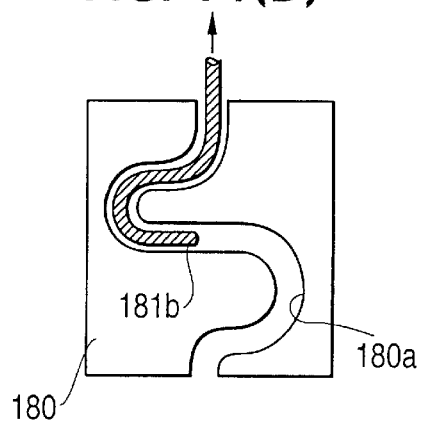

As shown in FIG. 14(a), the second EA mechanism 120 of the fourth embodiment is provided with, in place of the columns 174 and 175 used in the third embodiment which are constructed such that the distance R therebetween is gradually reduced, a load limiting block 180 formed of a metal having a rectangular parallelepiped shape. The load limiting block 180 is provided with a wire guide 180a which is formed of a meandered guiding groove though which a wire 181 passes in a meandered manner. The wire 181 having a constant diameter is fitted inside the wire guide 180a. When an end 181a of the wire 180 is pulled upward as shown in FIG. 14(b), the wire 181 moves upward while it is guided by the wire guide 180a. At this time, the wire 181 receives a bending stress.

When the wire 181 is pulled upward for a predetermined length, the other end of the wire 181 moves into the wire guide 180a. Then, when the wire 181 is pulled still further upward, the length of a part of the wire 181 which remains inside the wire guide 180a is gradually reduced. More specifically, the length of a part of the wire 181 which remains inside the wire guide 180a and receives the bending stress is gradually reduced in the sequence of the length shown in FIG. 14(*b*), the length shown in FIG. 14(*c*), and the length shown in FIG. 14(*d*). Thus, the bending stress applied to the wire 181 is also gradually reduced. Accordingly, also in the second EA mechanism 120 according to the fourth embodiment, the second EA load can be gradually reduced.

Other constructions, operations, and effects according to the fourth embodiment are the same as those in the third embodiment.

Although the second EA load is gradually reduced in the second to fourth embodiments, the present invention is not limited to this. For example, a construction shown in FIG. 15 may also be applied.

Figure 15:
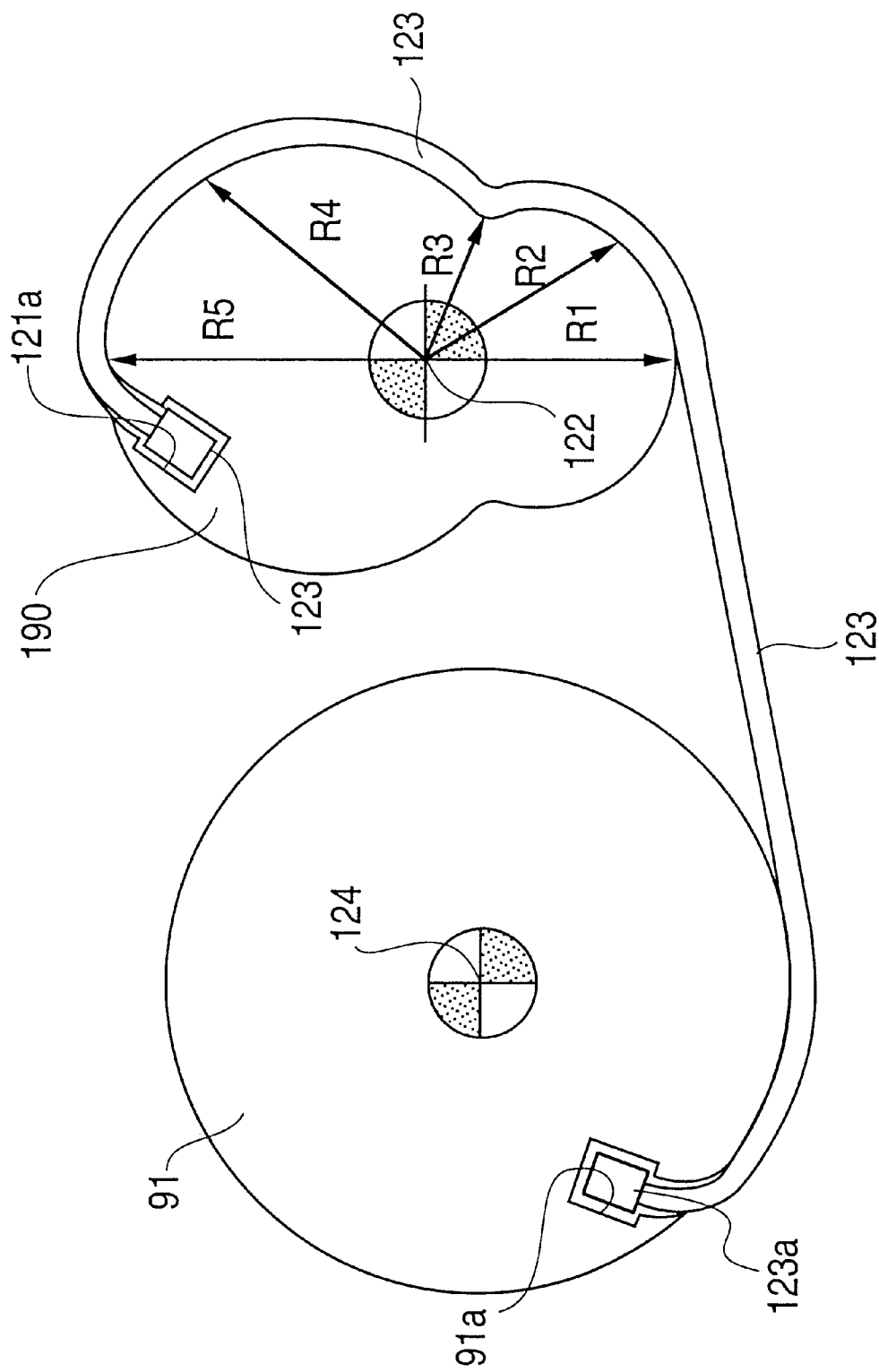
FIG. 15 is a schematic diagram which shows an EA mechanism used in a seat belt retractor according to a fifth embodiment of the present invention.

FIG. 15 is a schematic diagram which shows a second EA mechanism used in a seat belt retractor according to a fifth embodiment of the present invention.

As shown in FIG. 8, in the first embodiment of the present invention, the second pulley 121 is formed in a circular shape. As shown in FIG. 15, however, in the fifth embodiment of the present invention, the second EA mechanism 120 is provided with, in place of the second pulley 121 used in the first embodiment, a third pulley 190 having the shape of an irregular circle. In the third pulley 190, the arm length R of the moment is reduced in the order of R5>R4>R1>R2>R3. In other words, the rotational diameter of the third pulley 190 at the point on which the third pulley 190 receives a force from a wire 123 varies. Thus, the moment is also reduced in the above-described order, so that, contrarily, the second EA load is increased in the above-described order.

Figure 16:
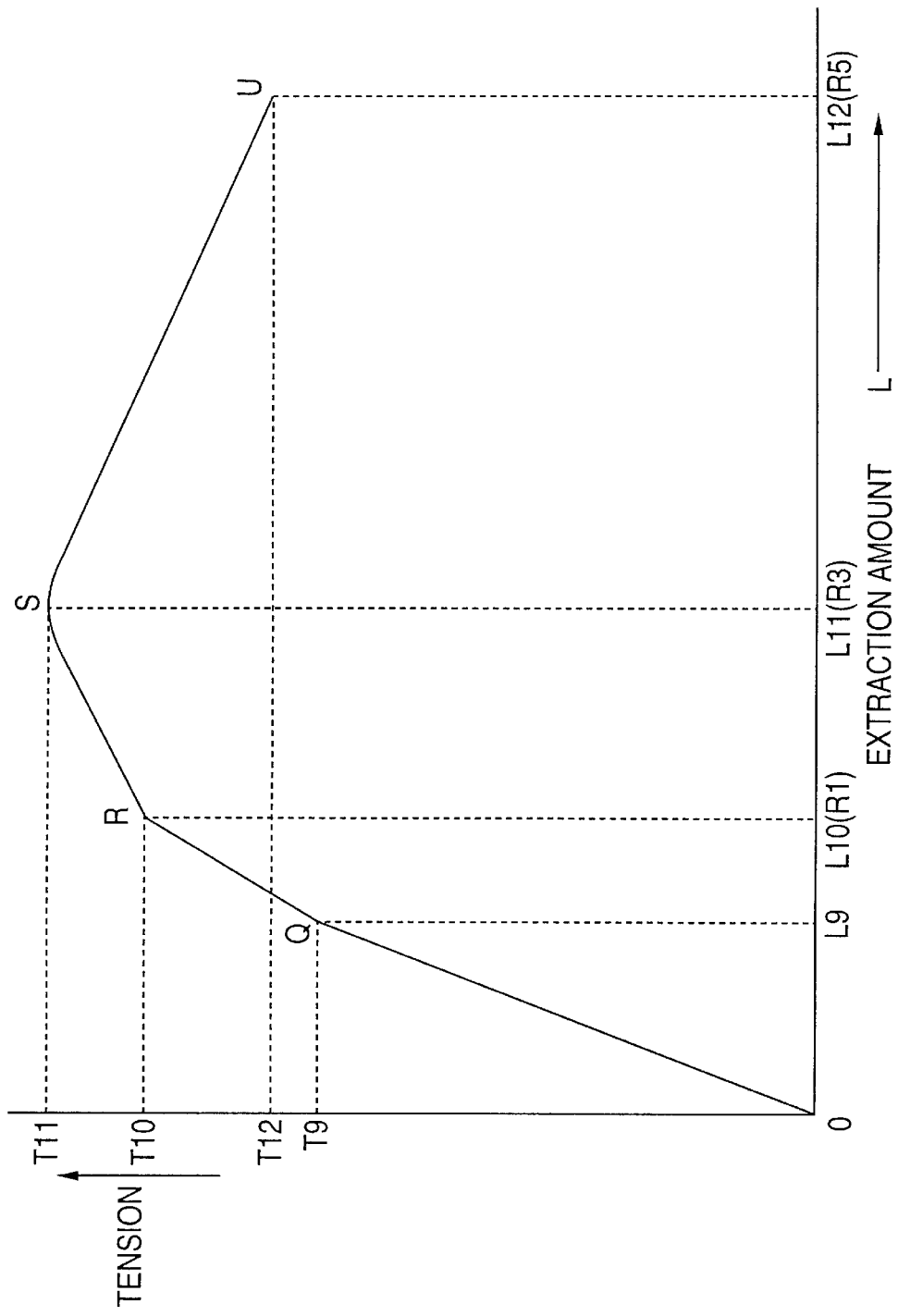
FIG. 16 is a graph which schematically shows a characteristic of a second EA load in the EA mechanism which is used in the fifth embodiment of the present invention.

FIG. 16 is a graph which schematically shows a characteristic of the second EA load in the EA mechanism according to the fifth embodiment.

As shown in FIG. 12, in the first embodiment of the present invention, the tension T is linearly reduced from point M at which the mechanical loss is zero. However, as shown in FIG. 16, in the second EA mechanism 120 according to the fifth embodiment, the second EA load is increased from point R at which the mechanical loss is zero (which corresponds to the state in which the arm length of the moment is R1) to point S (which corresponds to the state in which the arm length of the moment is R3). Then, after passing through point S (which corresponds to the state in which the arm length of the moment is R3), the second EA load is gradually reduced in a similar manner to line MN shown in FIG. 12, and then reaches point U (which corresponds to the state in which the arm length of the moment is R5). Accordingly, the second EA load is controlled in such a unique manner.

Other constructions, operations, and effects according to the fifth embodiment are generally the same as those in the first embodiment.

Instead of the third pulley 190 having the shape like an irregular circle, pulleys having other various shapes may also be applied, so that the second EA load may be controlled flexibly in accordance with requirements.

As is apparent from the descriptions above, in a seat belt apparatus in which the present invention is applied, the energy absorbing mechanism has a load limiting characteristic such that the load is gradually reduced after reaching the load limit. Thus, the load applied to an occupant by the webbing W during a vehicle collision is gradually reduced with time. Accordingly, by setting the inclination of the load reduction in the load limiting characteristics, the requirement to absorb the energy flexibly may be reliably satisfied.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor which, in a normal situation, allows a free extraction and retraction of a webbing which is wound around a spool, and which, in an emergency, restrains an occupant by stopping the extraction of the webbing, said seat belt retractor comprising:

an energy absorbing mechanism configured to limit a load applied to the webbing within a load limit in the emergency, wherein said energy absorbing mechanism is configured to gradually reduce the load applied to the webbing after the load limit is reached;

wherein said energy absorbing mechanism comprises a torsion bar which is twisted by a torque caused by an extraction force applied to said webbing in the emergency, and which absorbs an impact energy which occurs in the emergency, and wherein the energy absorbing mechanism is configured so that the torque applied to the torsion bar is gradually reduced so that the load applied to the webbing is gradually reduced after reaching the load limit;

further comprising a circular pulley attached to said torsion bar in a decentered manner and a wire wound around said circular pulley, and wherein said wire is configured to be pulled by a force caused by the extraction force applied to the webbing, so that the torque applied to the torsion bar is gradually reduced.

2. A seat belt retractor, which, in a normal situation, allows a free extraction and retraction of a webbing which is wound around a spool, and which, in an emergency, restrains an occupant by stopping the extraction of the webbing, said seat belt retractor comprising:

an energy absorbing mechanism configured to limit a load applied to the webbing within a load limit in the emergency, wherein said energy absorbing mechanism is configured to gradually reduce the load applied to the webbing after the load limit is reached;

wherein said energy absorbing mechanism comprises a wire having a constant diameter and a pair of members positioned to sandwich and compress said wire, the members being arranged in such a manner that a gap exists between the members, and wherein said wire is configured to be pulled by a force caused by the extraction force applied to said webbing;

wherein the members are arranged so that the gap between the members is increased as the wire is pulled, and wherein the compression force applied to said wire by said paired members is gradually reduced, so that the load applied to the webbing is gradually reduced after reaching the load limit.

3. A seat belt retractor, which, in a normal situation, allows a free extraction and retraction of a webbing which is wound around a spool, and which, in an emergency, restrains an occupant by stopping the extraction of the webbing, said seat belt retractor comprising:

an energy absorbing mechanism configured to limit a load applied to the webbing within a load limit in the emergency, wherein said energy absorbing mechanism is configured to gradually reduce the load applied to the webbing after the load limit is reached;

wherein said energy absorbing mechanism comprises a torsion bar configured to be twisted by a torque caused by an extraction force applied to said webbing in the emergency, wherein the torsion bar is adapted to absorb an impact energy which occurs in the emergency;

a pulley attached to said torsion bar and having an exterior configured so that a rotational radius that varies; and a wire wound around said pulley and connected to said pulley at one end; wherein said wire is configured to be pulled by a force caused by the extraction force applied to said webbing and said pulley rotates so that the torque is applied to said torsion bar, and wherein the varied rotational radius of said pulley gradually reduces the torque, so that the load on the webbing is gradually reduced after reaching the load limit.

4. A seat belt retractor, that stops extraction of the seat belt webbing in the case of an emergency, comprising:

an energy absorbing mechanism configured to limit a load applied to the webbing in the emergency, wherein the energy absorbing mechanism comprises a torsion bar attached at one end to a circular pulley in a decentered manner and a wire wound around the circular pulley;

wherein the wire is configured to be pulled by an extraction force applied to the webbing so that when the wire is pulled the pulley rotates thereby applying torque to the torsion bar; and wherein the torque applied to the torsion bar is gradually reduced so that the load applied to the webbing is gradually reduced after reaching a load limit.

5. A seat belt retractor that, in the case of an emergency, restrains an occupant by stopping extraction of a seat belt webbing comprising:

an energy absorbing mechanism configured to limit a load applied to the webbing in the emergency, the mechanism including a wire having a constant diameter and a pair of members positioned to sandwich and compress said wire in a gap between the members; and wherein the wire is configured to be pulled by an extraction force applied to the webbing; and wherein the members are arranged so that the gap between the members increases as the wire is pulled thereby gradually reducing the compression force applied to the wire so that the load applied to the webbing is gradually reduced after reaching a load limit.

6. A seat belt retractor which, in an emergency, restrains an occupant by stopping the extraction of a seat belt webbing comprising:

an energy absorbing mechanism configured to limit a load applied to the webbing in the emergency, the energy absorbing mechanism comprising a torsion bar attached to a pulley having an exterior configured with a varying rotational radius, and a wire wound around the pulley and connected to the pulley at one end; and wherein the wire is configured to be pulled by an extraction force applied to the webbing thereby rotating the pulley to apply torque to the torsion bar, and wherein the varied rotational radius of the pulley gradually reduces the torque applied to the torsion bar so that the load on the webbing is gradually reduced after reaching a load limit.

* * * * *